United States Patent [19]
Cantrell

[11] 4,423,554
[45] Jan. 3, 1984

[54] INSULATION DEPTH GAUGE

[76] Inventor: James E. Cantrell, 207 Over Creek Rd., Greenville, S.C. 29607

[21] Appl. No.: 254,742

[22] Filed: Apr. 16, 1981

[51] Int. Cl.³ .............................................. G01B 3/28
[52] U.S. Cl. .................................... 33/169 B; 33/161; 33/458; 33/478; 33/494
[58] Field of Search ..................... 33/169 B, 161, 474, 33/126.7 R, 458, 484, 458, 480, 471, 494, 495, 452, 479, 483

[56] References Cited

U.S. PATENT DOCUMENTS

| | | | |
|---|---|---|---|
| 77,121 | 4/1868 | Steele | 33/458 X |
| 1,158,508 | 11/1915 | Kramer | 33/478 |
| 1,239,742 | 9/1917 | Taylor | 33/480 |
| 1,643,033 | 9/1927 | Schvetz | 33/495 |
| 2,077,828 | 4/1937 | Dombrowski | 33/494 |
| 2,518,128 | 8/1950 | Dufilho | 33/161 |
| 3,145,475 | 8/1964 | Alford | 33/161 X |
| 3,274,692 | 9/1966 | Morrison | 33/169 B |
| 3,559,292 | 2/1971 | Weissman | 33/169 B |

Primary Examiner—William D. Martin, Jr.
Attorney, Agent, or Firm—Bailey & Hardaway

[57] ABSTRACT

An insulation depth gauge for measurement of insulation depths within an attic at remote locations has a handle for extending linear measuring means to remote locations and indicia to indicate the depth of insulation at that location.

4 Claims, 4 Drawing Figures

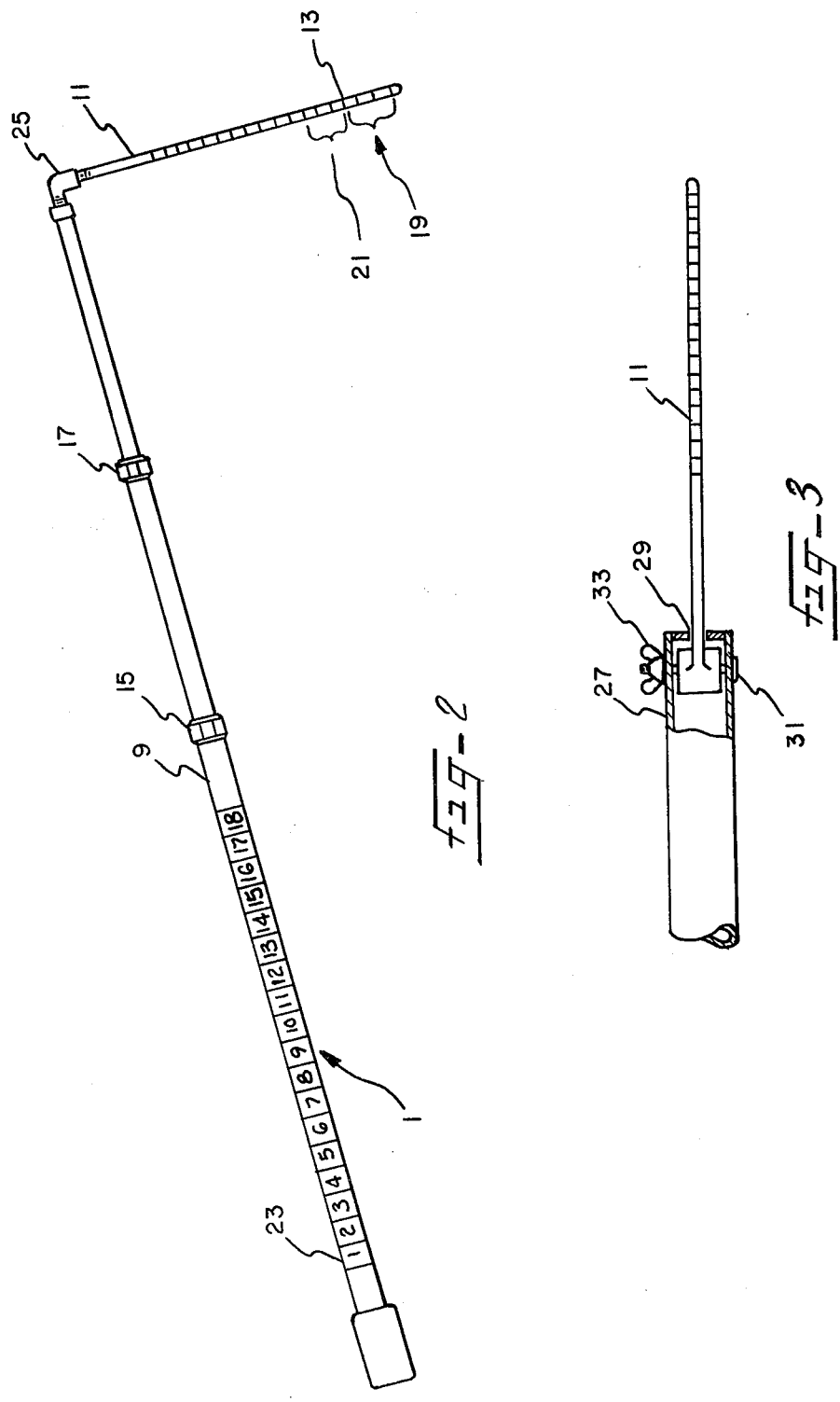

INSULATION DEPTH GAUGE

BACKGROUND OF THE INVENTION

This invention relates generally to the art of insulating a dwelling for the purpose of preventing the transfer of heat between the roof structure of the dwelling and the exterior environment, and more particularly to the art of measuring the quantity of insulation depths in remote locations of an attic.

The advent of significantly increased energy costs has brought emphasis to the importance of properly insulating a dwelling so as to prevent significant heat transfer between the interior of the dwelling and the exterior. The area of a dwelling most susceptible to such heat transfer is the area immediately adjacent the roof structure of the dwelling. Generally such dwellings comprise an attic between the uppermost floor of the dwelling and the roof structure. An attic normally comprises joists to which the ceiling of the subjacent floor is attached with a volume defined by the spacing between joist and the ceiling structure. In order to prevent heat transfer between the interior and exterior of the dwelling, this volume between joist is at least partially filled and frequently totally covered with an insulating material so as to maintain the environment below the ceiling structure as unaffected as possible from the influence of environmental conditions on the exterior of the dwelling. The effectiveness of insulation in preventing heat transfer is to a large extent determined by the depth of insulation and the density of that insulation.

Utility companies in order to promote proper insulation of dwellings in conjunction with various governmental agencies promoting the importance of proper insulation have made available rate structures which encourage proper insulation. In order to determine compliance with the criteria for reduced rate structures, it has become necessary to have inspectors measure the insulation depth within attic structures, i.e., the insulation depth as measured from the ceiling to the top of the insulation existing above the ceiling and between the ceiling joists.

It has heretofore been required of insulation inspectors that they travel within an attic structure to various locations in order to measure the insulation depth at several locations within the attic. This has required the inspectors to move precariously from joist to joist sometimes in a kneeling position in order to carry a measuring instrument such as a yardstick or ruler to remote locations for measurement. The hazards accompanying such efforts are readily apparent, and many such inspectors have been injured by failure to maintain contact with a supporting joist, resulting in not only damage to the subjacent ceiling structure, but injury to the inspector.

In addition to the dangers associated with movement within an attic structure, there are numerous discomforts associated with such movement. Attics are subject to extremes of temperature. Inspectors are subject to clothing soilage by insulating material and frequently may be subject to bronchial irritation, particularly if the individual suffers from allergic reaction to the insulating material. Movement within an attic structure may also rearrange insulation so as to impair its effectiveness.

SUMMARY OF THE INVENTION

It is thus an object of this invention to provide a means for measuring insulation depths at locations within an attic structure without the necessity of actually traveling about the attic structure.

It is a further object of this invention to provide a measuring instrument which may be operated from a single position to remote locations within an attic structure but which permits identification of depths at the point of operation.

It is a still further and more particular object of this invention to provide such an instrument which is capable of easy transport into and out of an attic access while permitting depth measurements at remote locations from that access.

These as well as other objects are accomplished by an insulation depth gauge having a handle, linear measuring means attached to the handle at an angle thereto and indicia on the measuring means to indicate the depth of insulation at the point of measurement.

BRIEF DESCRIPTION OF THE DRAWINGS

FIG. 2 of the drawings shows the depth gauge of this invention in a plan view.

FIG. 3 is a cutaway view of an embodiment of this invention.

DETAILED DESCRIPTION

In accordance with this invention, it has been found that an insulation depth gauge may be constructed so as to permit insulation depth measurement at various locations within an attic structure from the attic access or scuttle, thus making it unnecessary to physically travel within the attic structure for the purpose of obtaining measurements.

In accordance with this invention, the term insulation is utilized to identify material which is utilized to prevent heat transfer between the interior and exterior of a structure. Such insulation may comprise fibrous bats or loose fibrous material which is frequently formed of fiberglass or fibrous oxide materials. Depth of insulation is generally the vertical distance between the bottom of the insulation support and the upper surface of insulation. The depth at present is generally measured in inches in order to determine compliance with various codes. However, any other unit of linear measurement may be utilized for such measurement.

Figure 1:
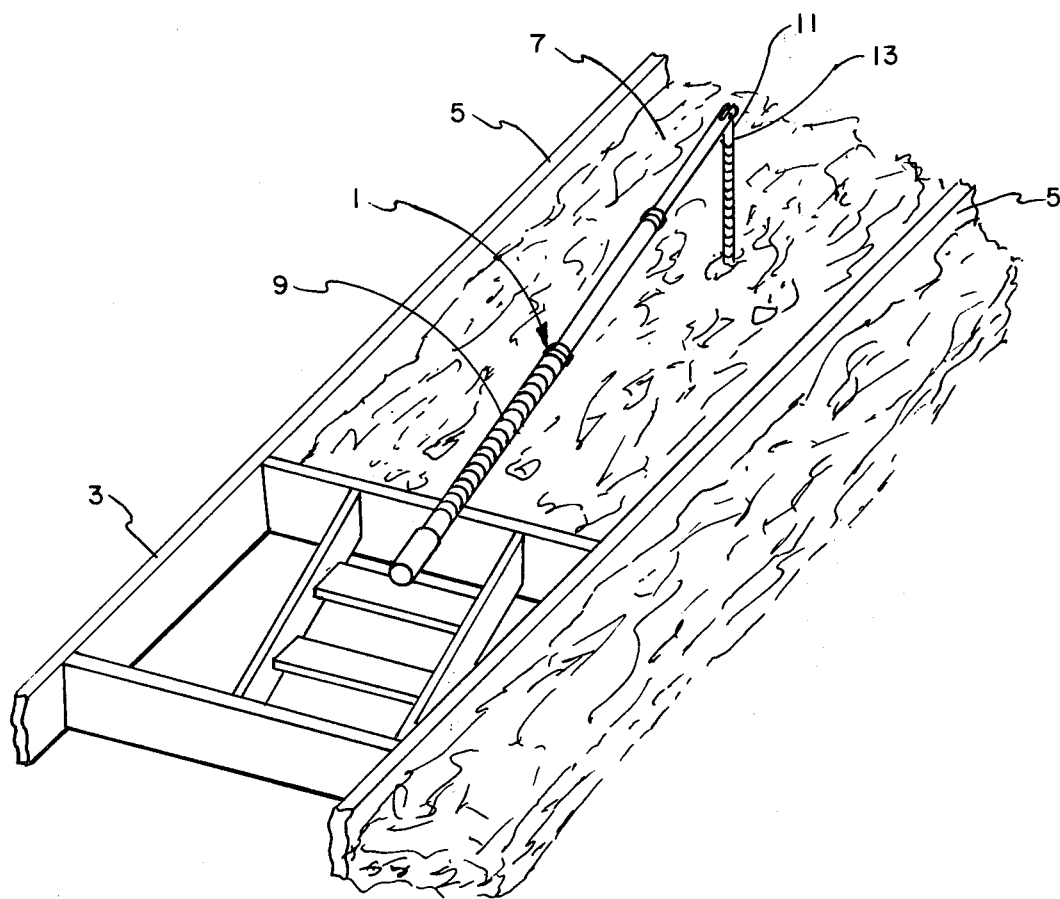
FIG. 1 of the drawings shows an attic access with the insulation depth gauge of this invention extended to a location within the attic structure.

FIG. 1 of the drawings illustrates the insulation depth gauge 1 as it would be utilized within an attic structure. Shown therein is an attic access 3, joist 5 and insulation 7. As seen within this drawing, the depth gauge 1 comprises a handle 9, measuring means 11 and indicia 13. As seen in FIG. 1, the measurement means 11 is extended by means of handle 11 to a location where indicia 13 may be utilized to measure the depth of insulation at the point of penetration where the linear measuring means 11 is submerged within the insulation.

FIG. 2 of the drawing illustrates in plan view the insulation depth gauge of this invention in greater detail. FIG. 2 illustrates a preferred embodiment of this invention wherein the handle 9 is a telescoping handle with the various telescoping sections illustrated at their points of connection 15 and 17. By use of such telescoping means, the handle is extendable to remote locations from an attic access. A preferred extent of extension is within the range of 12 to 20 feet, while compacting to a non-telescoped length of, for example, approximately 44 inches. This range of handle lengths permits measurements to be taken at locations near the attic access, as well as at areas remote from the attic access which would otherwise require significant movement by an inspector within the attic structure.

The handle of the insulation depth gauge in accordance with this invention may comprise hand grip 10 in order to facilitate the handling of the gauge during actual use and during transport. The hand grip 10 is preferably of a rubber type of insulating material in order to facilitate handling as well as provide electrical insulation in the event that contact is made with a source of electricity during use of the insulation depth gauge.

The insulation depth gauge comprises at an angle to the handle a linear measuring means. The linear measuring means 11 is adapted for the purpose of being submerged within the insulation and having that depth observed by the indicia 13 on the linear measuring means. The linear measuring means in its preferred form is of a non-electrical conducting material, such as fiberglass as is normally utilized within a fishing rod. Such non-conducting material is preferred because of the safety aspects associated therewith in the event that the depth gauge is brought into contact with live electrical wire. The linear measuring means may be of a length within the range of 12 to 18 inches which would ordinarily be sufficient to measure the insulation depths within all presently existing structures. It is contemplated, however, that the linear measurement means may be of any length which one would desire in order to handle any specialized applications.

The indicia 13 on linear measuring means 11 are for the purpose of identifying the numbered linear units of depth of insulation. It is preferred that sections of units be color coded in order to assist the inspector in identifying the actual depth of penetration. As shown in FIG. 2, the sections of indicia shown bracketed by numeral 19 may be red, while those bracketed by numeral 21 may be yellow. In this way, an inspector would realize that 3 units of linear measurement are encompassed by the disappearance of red or that 6 units of measurement are encompassed by the disappearance of the yellow beneath the insulation surface.

A preferred aspect of this invention comprises matching indicia 23 on the handle 9. The indicia 23 is in direct correspondence to the indicia 13 on linear measuring means 11. The indicia 23 contains the same color code as indicia 13 and additionally comprises numeral units identifying quantities of linear measurement. In this preferred aspect, an inspector may visually observe the colors remaining above the surface of the insulation and may observe those same colors on the handle and identify the depth of insulation by the numeral corresponding to the color or sections of color appearing just above the insulation surface.

As shown in FIG. 2 of the drawing, the linear measuring means 11 is attached to handle 9 by means of a 90 degree connection 25. It is preferred that this connection 25 be threadedly connected to handle 9 to permit removal thereof. Such removal permits the measuring means 11 to be inserted into the volume of handle 9 through the opening in which the 90 degree connection 25 passes. Such a construction permits easy storage and transport of the device when not being actually utilized for measurement. It additionally permits the device to be easily transported into an attic through awkward passageways, such as narrow stairwells or ladders and assembly of the device once access to the attic has been achieved.

While the angle of connection at 25 in FIG. 2 is stated to be 90 degrees, it is within the contemplation of this invention that the angle of connection be adjustable. A structure of such adjustability is shown in a cutaway view in FIG. 3 wherein the last telescoping section 27 of handle 9 permits linear measuring means 11 to pass through a slot 29 which is in existence not only in the termination of section 27 but also in the side portions thereof so as to permit rotation of linear measuring means through as large an angle as possible. As shown in FIG. 3, such adjustment means comprises bolt 31 and wing nut 33 for adjustment of the angle between linear measuring means 11 and handle 9.

Also the embodiment of FIG. 3 permits storage of the linear measuring means within the volume 27 of the last telescoping section. By removal of bolt 31 the measuring means may be simply moved into the volume of section 27. Upon actual use of the insulation depth gauge, the linear measuring means 11 is simply removed from the volume of section 27 and bolt 31 reinserted and tightened so as to lock the measuring means at an appropriate angle.

Figure 4:
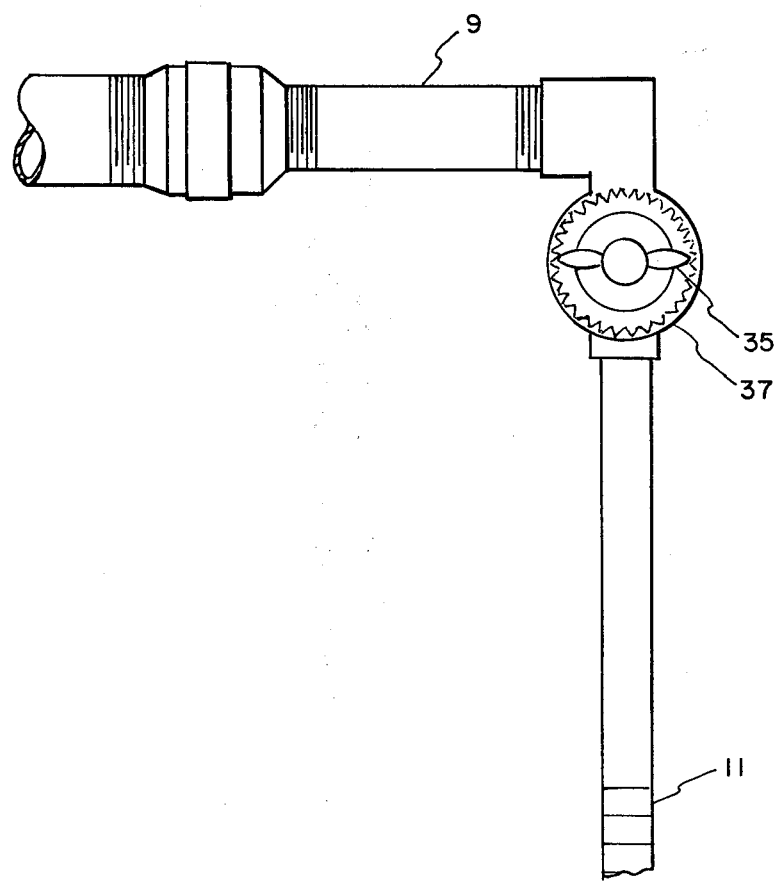
FIG. 4 is a plan view of yet another embodiment in accordance with this invention.

A further embodiment is shown in FIG. 4 of the drawings. Within this embodiment interlocking discs 37 permit adjustable attachment of handle 9 to measuring means 11. Adjustment is achieved by loosening or tightening wing nut 35. For storage or transport, measuring means 11 are brought alongside handle 9 for compactness. The structure is otherwise adjustable for any desired angle.

It is thus seen that the insulation depth gauge in accordance with this invention provides a means for insulation depth measurements at locations within an attic structure from an access to that structure without the need for an inspector to travel beyond the access. The insulation depth gauge in accordance with this invention greatly minimizes the risks associated with such inspections, and provides for the avoidance of the unpleasantness associated with travel within an attic structure and its attendant extremes of temperature, inherent dangers and garment soilage. As many variations will be apparent from a reading of the above specification, such variations are embodied within the scope of this invention as measured by the following appended claims.

That which is claimed is:

1. An insulation depth gauge comprising:
    a handle having indicia thereon, said handle comprising a plurality of telescoping sections for the collapse or extension thereof;
    linear measuring means attached to said handle at an angle thereto to permit depth measurement in a direction other than the direction defined by said handle; and
    indicia on said measuring means to indicate depth of penetration into insulation; and
    wherein indicia on said handle corresponds to indicia on said linear measuring means; and
    wherein said indicia on said linear measuring means comprise color coded sections indicating units of linear measurement, and said indicia on said handle comprises-color coded sections corresponding to said color coded sections-of said linear measuring means and having numeral indicia thereon to identify the number of units of linear measurement submerged to said depth of penetration.

2. The insulation depth gauge according to claim 1 further comprising means for detaching said linear measuring means from said handle and said handle defines within its volume storage volume for said linear measuring means.

3. The insulation depth gauge in accordance with claim 1 wherein said angle is about 90 degrees.

4. An insulation depth gauge comprising:
a handle having indicia thereon;
said handle comprising a plurality of telescoping sections for the collapse or extension thereof, said handle comprising a plurality of telescoping sections for the collapse or extension thereof;
linear measuring means attached to said handle at an angle thereto to permit depth measurement in a direction other than the direction defined by said handle;
indicia on said measuring means to indicate depth of penetration into insulation; and
means for detaching said linear measuring means from said handle and wherein said handle defines within its volume, storage volume for said linear measuring means.

* * * * *